June 21, 1960　　　E. W. BONSLETT　　　2,941,770
SKID MEMBER AND PALLET CONSTRUCTION UTILIZING SAME
Filed Nov. 8, 1957
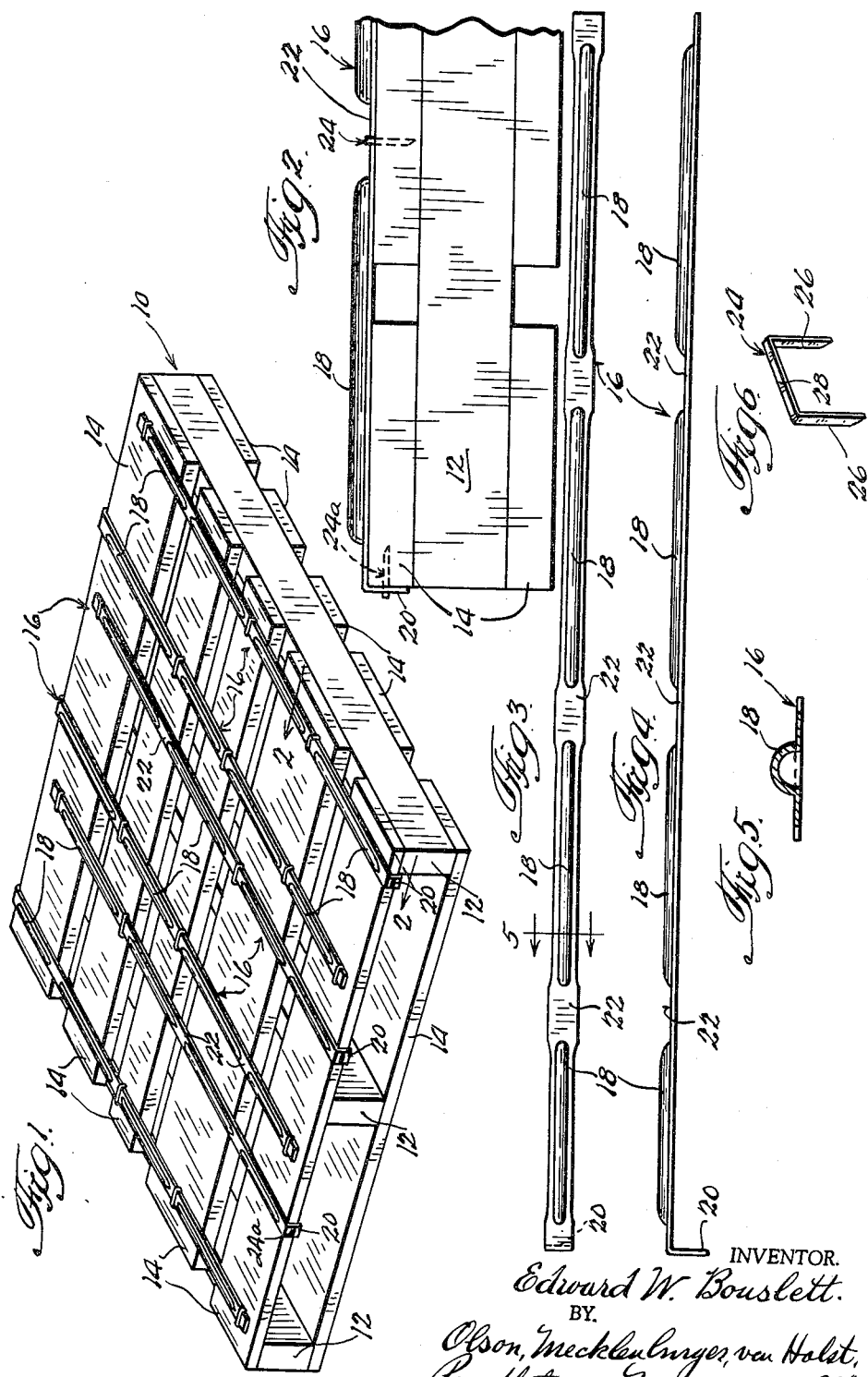
INVENTOR.
Edward W. Bonslett.
BY
Olson, Mecklenburger, van Holst,
Pendleton, & Neuman. Attys.

United States Patent Office 2,941,770
Patented June 21, 1960

2,941,770

SKID MEMBER AND PALLET CONSTRUCTION UTILIZING SAME

Edward W. Bonslett, 2403 Orchard St., Chicago, Ill.

Filed Nov. 8, 1957, Ser. No. 695,257

8 Claims. (Cl. 248—120)

This invention relates to a skid member for a pallet construction, and to a pallet employing a plurality of such skid members disposed on the load-supporting surface thereof.

In modern industrial plants and places of similar activity, the movement of bulky materials within the plant occurs numerous times daily. Such intra-plant transportation is facilitated by the use of well-known lift trucks having forks or equivalent structural members adapted to engage and lift pallets whereon the bulky materials are placed.

The loads to be moved are usually of a heavy, unwieldy nature, and accordingly must be slid onto and off the pallets. For example in the modern bottling or canning plant, individual containers are placed in large cases or cartons which must be moved within the plant. A pallet which is of inexpensive, sturdy construction as well as efficient in operation is, of course, very much desired.

In order to obtain maximum efficiency from a pallet construction it is usually designed so that bulky items, such as stacked cases or the like, may be moved onto and off support surfaces while incurring a minimum of frictional resistance therewith. The present invention is directed primarily to skid members of a novel construction secured to the upper or load-supporting pallet surface. The provided skids not only facilitate movement of material relative thereto, but also assist in maintaining the structural soundness of the entire pallet.

It is an object of this invention, therefore, to provide novel skid members for a pallet construction that effect minimum frictional resistance with materials slidably moving thereover.

It is a further object of this invention to provide skid members of such design that discrete fastening means may secure the skids to the load-supporting surface of the pallet while enabling the usual wooden components of the pallet to expand or contract without buckling or compressing any pallet component.

It is another object of this invention to provide novel skid members adapted for use with supporting pallet frameworks of varying design and construction.

It is a still further object of this invention to provide a pallet construction in which the skid members are secured to the pallet framework so as to reinforce the pallet construction as will hereinafter be explained in greater detail.

The above and other objects of this invention will become more apparent from the following detailed description when read in the light of the accompanying drawing and appended claims.

In one embodiment of the provided pallet construction a common type of wooden pallet is provided, composed of spaced parallel members such as two-by-fours to which transverse, spaced boards are secured by nails or like fasteners. To facilitate slidable movement of heavy objects onto and off the load-supporting surface of the pallet, a plurality of novel, spaced skids is provided. Each of the skids is fixedly secured at one end portion to an end surface portion of the pallet. Each skid has projecting rib portions formed therein along the main skid area which are arranged over the pallet support surface. The ribs are of dissimilar length, and are longitudinally separated or interrupted by planar or flat portions of the skids. Securing means, preferably staple members, straddle the skid flats and urge the same against the underlying pallet surface.

By being irregularly spaced, at least some of the skid flats will be arranged over solid portions of the pallet surface on which disposed if such surface is composed of spaced board members. The height to which the distal portions of the skid ribs project from the flats is such as to enable cases or the like to be slid over the skid ribs without engaging the staples or other equivalent fasteners. The skid construction enables the frictional resistance to the sliding of the object thereover to be maintained at a bare minimum while simultaneously reinforcing the pallet construction, as will be explained hereinafter in greater detail.

For a more complete understanding of this invention reference is made to the drawing wherein:

Figure 1 is a perspective view of a pallet made in accordance with the invention.

Fig. 2 is an enlarged, fragmentary, end elevational view of a portion of the pallet illustrated in Fig. 1 and taken along the line 2—2 of the latter figure.

Fig. 3 is a top plan view of one of the skid members employed in the pallet illustrated in Fig. 1.

Fig. 4 is a side elevational view of the skid member illustrated in Fig. 3.

Fig. 5 is an enlarged sectional view of the skid member illustrated in Fig. 3 and taken along line 5—5 thereof.

Fig. 6 is a perspective view of a staple member employed in the provided pallet construction illustrated in Figs. 1 and 2.

Referring now to the drawing, and more particularly to Fig. 1, a pallet 10 is illustrated which is adapted for use in a number of industrial plants such as bottling plants and the like. The pallet 10 comprises a wooden framework composed of parallel members 12, which may be two-by-fours. Transverse board members 14 are nailed to opposed longitudinal edges of the three illustrated two-by-fours 12. It should be noted that the specific width and other dimensions of the wooden pallet members 12 and 14 are not of particular significance, and those members depicted in the drawing are shown only by way of illustration. The relationship between the various board members, however, should enable the final pallet construction to be readily engaged by the prongs or fork portions of a lift truck (not illustrated) which is commonly used in industrial plants for moving pallets of the type illustrated from one point to another.

It will be noted, for instance, that in Fig. 1 the opposed transversely disposed board members 14 are spaced by the members 12 a sufficient distance to enable the prongs of a lift truck to be insertable therebetween with ease and thus the pallet 10 may be readily lifted and transported to a desired location.

The usual pallet construction found in the average industrial plant is made of low-grade or scrap lumber of non-uniform width and having rough surfaces. Furthermore, since the illustrated pallet 10 is generally employed for movement of bulky and heavy articles, as above mentioned, such as stacked cases of soft drinks in bottling works, it is desirable, if not essential, that some means be disposed on the upper supporting surface of the illustrated pallet 10 whereby the slidable movement of stacked cases or the like onto and off of the pallet 10 is facilitated.

Such means provided by this invention comprise the illustrated elongate skid members 16. It will be at once apparent from Figs. 3 and 4 that skids 16 are composed of elongate strips of steel or other suitable material wherein or on which rib portions 18 have been formed by any of a number of well-known operations.

From Fig. 5 it will be seen that each of the ribs is preferably of a curvilinear cross-sectional configuration to effect a line contact with any material such as cases of soft drinks or the like, which are slidably moved thereover. By effecting a line contact with the ribs the frictional resistance offered thereby is maintained at a minimum because of the minimal area of contact between the moving object and the supporting ribs.

As seen from Figs. 1 and 4, one end portion of each of the skids 16 is bent at a substantially right angle to the remainder of the skid to form a lug 20. Each of the lugs 20 is fixedly secured by means such as staple 24a (see Figs. 1 and 2) or like means to one end surface portion of the provided pallet 10. Each skid 16 is thus fixedly secured at one end portion to an end of the provided pallet 10.

It will be noted in the various figures of the drawing that ribs 18 formed in the metal strips 16 are maintained in spaced relation by interposed planar or flat portions 22 of the skids 16. As seen in Figs. 2 and 4, the height to which each of the ribs 18 of each skid 16 projects above the skid flats 22 is sufficient to enable a securing means such as illustrated staples 24 to secure the flat portions of each skid to the load-supporting surface of each pallet without obstructing movement across the pallet. In the normal position of assembly, a bridging or spanning portion 28 of each staple (see Fig. 6) is disposed below the uppermost level of each rib 18. As a result of this relationship between the staples 24 and the skid portions, a load may normally be slid over the skid ribs without encountering the resistance of a projecting staple portion.

Although the staples 24 have their opposed leg portions 26 (see Fig. 6) imbedded in the load-supporting surface of the illustrated pallet 10, the latter leg portions straddle the flats of each skid 16 (see Fig. 1). Consequently relative slidable movement between the staple bridge portion 28 and the engaged flat 22 of a skid 16 is possible during the expansion or contraction of the wooden pallet components, as under the influence of varying conditions of humidity.

Since, as has been above mentioned, each skid is rigidly secured at only one end portion to the illustrated pallet 10, relative movement between the skids and the staples and board members 14 is possible without producing buckling or tension in any of the wooden pallet components. It is preferable therefore that each of the staples 24 engage the associated skid 16 at approximately the mid-point of one of the flat portions 22 thereof. As a result of this relative disposition, the pallet may freely move beneath the skid in either direction parallel to the longitudinal axes of the skid members in the course of expansion or contraction, whether caused by change of humidity or temperature, contact with liquid, or other reason.

From Figs. 1, 3 and 4 it will be seen that the lengths of the individual ribs 18 formed in each skid 16 are dissimilar. As a result, the intervals between flats 22 of any skid 16 are also irregular. It is desired that these intervals be irregular to ensure the location of at least some of the flat portions over an underlying pallet support surface when such support surfaces are formed from board members of irregular width and spaced in a random manner such as that illustrated in Fig. 1.

Also, by being of irregular length, the ribs 18 and the flats 22 of skid members 16 arranged on a pallet support surface are never arranged in transverse alignment. Since flat portions are never transversely aligned, a forward edge of a soft drink case or the like will always be supported at least partially on a rib edge surface in the course of movement across the pallet. That is, the staggered transverse alignment of the ribs 18 of the provided skids prevents a forward edge of a case member or the like from falling into a depression formed by a plurality of transversely aligned flats 22.

As illustrated in Fig. 1, adjacent skids are secured to opposite ends of the provided pallet 10; thus the skids 16 are enabled to reinforce the pallet against distorting forces imparted thereto in the course of loading or unloading the pallet regardless of the side on which the loading or unloading takes place. It is apparent, of course, that the slidable loading or unloading movement of conveyed materials from or onto the pallet supporting surface is normally effected in directions parallel to the longitudinal axes of the skids 16.

The stapling of intermediate portions, i.e., the flats of the provided skids, to the supporting surface of pallet 10, enables the conveyed material, such as soft drink cases, to be moved transversely to the skids for purposes of positioning the same on the pallet, or for other purposes, without distorting engaged portions of the skids. The likelihood of distortion is substantially eliminated since each skid is reinforced or secured to a pallet surface at relatively short intervals.

A pallet construction has been provided constituting a substantial improvement over similar type pallets heretofore used. Although constructed of inexpensive elements, the pallet disclosed herein is sturdy, and, when subjected to normal use, has indefinite life. The provided pallet 10 is to be contrasted with a commonly used pallet construction which usually consisted of a wooden framework on which was disposed a plurality of parallel wires over which was slid the object to be loaded or unloaded. The ends of the wire were secured to the bottom of the pallet support surface. It is apparent that if any securing means such as a staple were used to secure portions of the wires to the pallet upper surface, they would provide resistance to the sliding movement of objects thereover. It is equally apparent that upon contraction or expansion of the wooden pallet framework the wire members would buckle or assume a state of tension thereby buckling the interposed wooden portions of the pallet.

The pallet 10 has novel skids affording minimal frictional resistance to a member slidably moving thereover. The provided skids are so designed as to be adaptable to pallet constructions of various types, and in addition to their compatability with expansion or contraction of the wooden framework, also serve to reinforce the same against forces tending to distort or move one portion of the pallet relative to another in the course of loading or unloading.

As previously noted, the pallet construction 10 is given only by way of illustration. It is apparent, for instance, that the boards 14 defining the pallet support surface need not be arranged in spaced relationship but may define a continuous solid surface. The securing means need not necessarily comprise the illustrated staple members 24 but may be clamp members of various types which do not span the entire width of the skid flats 22.

This invention is to be limited only by the scope of the appended claims.

I claim:

1. A skid member for a pallet construction, comprising an elongate member having a bottom surface adapted to be applied to the upper surface of a pallet framework and having a plurality of longitudinally spaced and substantially longitudinally extending rib portions protruding upwardly to a level substantially above said bottom surface, and portions substantially planar in surface configuration intermediate said substantially longitudinally extending rib portions having their uppermost surfaces substantially below said level, said intermediate skid portions being adapted for engagement by securing means having portions overlying said intermediate skid portions, said securing means lying entirely below the top of said rib portions.

2. A skid member as defined in claim 1 in which said rib portions are of curvilinear transverse cross-section thereby enabling an object engaging the same and sliding thereover to effect line contacts therewith and thus encounter a minimum of frictional resistance.

3. A skid member as defined in claim 1 in which said rib portions are of unequal length, thereby affording greater assurance of registry of at least some of said intermediate portions with portions of a pallet framework supporting surface when said surface is formed by irregularly spaced discrete members.

4. In a pallet construction having means defining a supporting framework, the improvement comprising a plurality of skid members arranged in laterally spaced relation on one surface of said framework, each of said skid members having protruding rib portions separated by planar portions, overlying staple means engaging said planar portions and anchored in said framework whereby said skid members are secured to said framework surface, one end of each of said skid members being bent relative to the remainder thereof and fixedly secured to an edge portion of said framework, said staple means engaging substantially the central portions of said skid planar portions whereby each of said skid members is securely affixed at one end thereof to said framework and slidably movable relative to the underlying supporting surface portions thereof upon expansion or contraction of said supporting surface portions.

5. The construction as recited in claim 4 in which said protruding rib portions of the skid members are of unequal length to provide for securing of said skid members to said framework surface at irregular intervals.

6. The construction as recited in claim 4 in which adjacent skid members are secured at one end portion of each thereof to opposite edge portions of the supporting framework.

7. A pallet construction comprising a supporting framework having upper members lying in a substantially horizontal plane in the normal position of use, a plurality of skid members disposed in laterally spaced relation on said upper members, each of said skid members having a bottom surface adapted to be applied to the upper members of said framework, each of said skid members also having longitudinally spaced and substantially longitudinally extending rib portions protruding upwardly to a level substantially above said bottom surface, skid portions having substantially planar surface configurations disposed intermediate said substantially longitudinally extending rib portions and having their uppermost surfaces substantially below said level of said rib portions, and securing means coacting between said framework and said skid members to secure the latter in position, said securing means having portions overlying said intermediate portions of said skid members, said securing means lying entirely below the top level of said rib portions thereof.

8. The pallet construction of claim 7 in which said securing means comprises staples having portions which bridge said intermediate portions of said skid members, the said staples lying entirely below the top level of said rib portions thereof.

References Cited in the file of this patent

UNITED STATES PATENTS

| | | |
|---|---|---|
| 1,153,991 | Wood | Sept. 21, 1915 |
| 1,826,835 | Spousta | Oct. 13, 1931 |
| 2,218,444 | Vineyard | Oct. 15, 1940 |
| 2,669,361 | Just | Feb. 16, 1954 |
| 2,681,198 | Cleaves | June 15, 1957 |
| 2,783,960 | Herz et al. | Mar. 5, 1957 |
| 2,823,883 | Bourdon | Feb. 18, 1958 |